US007193230B2

(12) United States Patent
Lagace et al.

(10) Patent No.: US 7,193,230 B2
(45) Date of Patent: Mar. 20, 2007

(54) LOW-WEIGHT ULTRA-THIN FLEXIBLE RADIATION ATTENUATION COMPOSITION

(75) Inventors: Arthur P. Lagace, Newtonville, MA (US); Ronald E. Blocher, Gettysburg, PA (US)

(73) Assignee: Bar-Ray Products, Inc., Littlestown, PA (US)

( * ) Notice: Subject to any disclaimer, the term of this patent is extended or adjusted under 35 U.S.C. 154(b) by 0 days.

(21) Appl. No.: 11/003,857

(22) Filed: Dec. 3, 2004

(65) Prior Publication Data

US 2005/0121631 A1 Jun. 9, 2005

Related U.S. Application Data

(60) Provisional application No. 60/527,326, filed on Dec. 5, 2003.

(51) Int. Cl.
*G21F 1/10* (2006.01)
*C08K 5/36* (2006.01)

(52) U.S. Cl. .............................. 250/515.1; 250/519.1; 523/136; 524/283

(58) Field of Classification Search ............ 250/515.1, 250/519.1; 523/136; 524/283
See application file for complete search history.

(56) References Cited

U.S. PATENT DOCUMENTS

| | | | | |
|---|---|---|---|---|
| 2,052,788 | A | 9/1936 | Miller | 242/75 |
| 2,858,451 | A | 6/1942 | Melhose | 179/4 |
| 2,404,225 | A | 7/1946 | Green | 250/108 |
| 3,093,829 | A | 6/1963 | Maine | 2/2 |
| 3,514,607 | A | 5/1970 | Webster | 250/108 |
| 3,622,432 | A | 11/1971 | McCluer et al. | 161/87 |
| 3,818,234 | A | 6/1974 | Johnson et al. | 250/551 |
| 3,883,749 | A | 5/1975 | Whittaker et al. | 250/516 |
| 3,935,099 | A | 1/1976 | Weaver et al. | 210/43 |
| 3,996,620 | A | 12/1976 | Maine | 2/2 |
| 4,463,156 | A | 7/1984 | McGary et al. | 528/65 |
| 4,913,978 | A | 4/1990 | Klotz et al. | 428/551 |
| 4,938,233 | A | 7/1990 | Orrison | 128/849 |
| 4,980,564 | A | 12/1990 | Steelmon | 250/505 |
| 5,001,354 | A | 3/1991 | Gould et al. | 250/516 |
| 5,059,807 | A | 10/1991 | Kersten et al. | 250/519 |
| 5,140,710 | A | 8/1992 | Rademacher | 2/432 |
| 5,245,195 | A | 9/1993 | Shah et al. | 250/515 |
| 5,247,182 | A | 9/1993 | Servant et al. | 250/516.1 |
| 5,525,408 | A | 6/1996 | Weir et al. | 428/220 |
| 5,548,125 | A | 8/1996 | Sandbank | 250/519.1 |
| 5,550,383 | A | 8/1996 | Haskell | 250/519.1 |
| 6,153,666 | A * | 11/2000 | Lagace | 523/136 |
| 6,310,355 | B1 | 10/2001 | Cadwalader | 250/515.1 |

* cited by examiner

*Primary Examiner*—David Vanore
(74) *Attorney, Agent, or Firm*—Barry G. Magidoff; Paul J. Sutton

(57) ABSTRACT

A thin, light-weight, flexible sheet product useful for the manufacture of radiation attenuation garments. The sheet product is a polymeric material and includes a heavy loading of high molecular weight metal particles. The sheet product is formed from a polymer latex dispersion into which a high molecular weight metal particles are dispersed, where the latex retains a sufficiently low viscosity to be pourable and allow casting of the sheet product.

29 Claims, No Drawings

LOW-WEIGHT ULTRA-THIN FLEXIBLE RADIATION ATTENUATION COMPOSITION

CROSS REFERENCE TO RELATED APPLICATION

This application claims priority of U.S. provisional application Ser. No. 60/527,326, filed Dec. 5, 2003 and entitled "Low-Weight Ultra-Thin Flexible Radiation Attenuation Composition".

BACKGROUND

1. Field

X-ray equipment is commonly found in hospitals, dentist and doctor offices, veterinarian facilities, industrial testing and QC laboratories and the like. Medical personnel, technicians, and patients wear X-ray shielding garments to protect them from both direct and secondary exposure to radiation.

In addition, today various procedures of scientific and medical significance involve the use and handling of radioactive compounds. The use of radioactive compounds is now commonplace in laboratories, hospitals and physician's offices. The handling and use of these compounds exposes the user and subject to potentially harmful amounts of ionizing radiation.

To date, many compositions have been utilized in an effort to reduce the risk associated with exposure to X-ray and ionizing radiation. Typically these compositions have been metallic lead powder-loaded polymeric or elastomeric sheet goods that are incorporated into garments designed to provide personal protection. For example, lead loaded aprons, thyroid shields, gonad shields, and gloves have been marketed for their protective properties. Attenuation garments are needed to protect the user from specified levels of radiation.

Additionally, these garments should be light in weight and exhibit suitable mechanical properties such as tensile strength, tear and puncture resistance, crease and fold resistance, etc. Further, the garments need to be resistant to cleaning by detergents, alcohols and other agents typically used in medical environments. Finally, the garments should preferably maintain their properties without immediate or long term degradation, when subjected to radiation. Many polymeric materials, particularly those that contain unsaturated bonds, such as natural rubber, are susceptible to degradation from radiation, becoming brittle and cracking, thus possibly allowing radiation penetration.

Lead filled polymers are most often used in the manufacture of protective garments. In these polymer compositions, the polymers serve as a matrix for incorporation of the powdered lead, or other high atomic weight metals or compounds. The polymers commonly employed include highly plastisized polyvinyl chloride (PVC), polyethylene and other olefins, elastomers, and many other flexible polymers. The process of forming the filled polymer composition usually includes mixing the metal into the plastic using standard thermoplastic compounding equipment such as two-roll mills. In the case of PVC, standard plastisol production equipment and processes are employed.

The finished products are usually designed to provide protection equivalent to a sheet of lead 0.5 mm in thickness, but the degree of radiation attenuation may be adjusted to meet the final application, and normally ranges from 0.1 mm to 1.5 mm of lead equivalence.

Commercially, single layers of cast sheets of lead-filled polymer compositions are available and provide different levels of protection, depending on the sheet thickness and lead loading. The most widely available protective sheet is made of plastisized PVC. A plastisol is prepared by mixing dispersion grade PVC with a plasticizer such as dioctyl phthalate (DOP). The metal powder is then added and the viscous mix de-aerated. The mixture is coated onto release paper using standard casting equipment such as a knife over roll process and heated in an oven to approximately 400° F. to cure the resin. Other filled polymers, such as polyethylene-lead formulations are blended using intensive mixers such as a Banbury or a two roll mill and formed into sheets using calenders or extruders using procedures well-known in the art of polymer compounding.

Sheets of plastisized PVC are most often commercially available in thicknesses providing protection of 0.125 mm equivalence of lead, 0.167 mm equivalence of lead, 0.175 mm equivalence of lead, 0.25 mm equivalence of lead, and the like. Sheets may be combined to achieve desired radiation attenuation. For example, three cast sheets of 0.167 mm rating are combined to provide 0.50 mm of protection.

One disadvantage of producing PVC based sheets is that the process necessarily involves mixtures which have very high viscosities which most often result in poor wetting of the metals and poor dispersions of the metal in the plasticizer. Poor dispersion of the metal will lead to lower and uneven radiation attenuation performance of the final product.

Another disadvantage of using PVC sheet is the excess weight of the final product necessary to provide the equivalence of 0.5 mm of lead. Three layers of 0.0167 thick lead loaded PVC weigh approximately 1.35 pounds per square foot. An apron constructed of the three sheets and associated nylons shells, buckles and the like can weigh 20 pounds or more. As a result of the weight and the length of time the protective garments sometimes must be worn, as by x-ray technicians, it has long been an objective of designers and producers of radiation attenuation material to achieve lighter weight products while maintaining the standard attenuation of 0.5 mm of lead.

SUMMARY OF THE INVENTION

An object of the invention is to provide an ultra thin, light-weight, flexible sheet product useful for radiation attenuation. The invention provides for a polymer latex composition from which sheets can be prepared that incorporate heavy weight and high volume loadings of one or more high atomic weight metals and wherein the cured sheets are thinner and of lower weight than currently available compositions, while maintaining the desired level of radiation attenuation and structural properties, in both the latex dispersion and final sheet product.

Specifically, sheets can be prepared by admixing high atomic number elements or their related compounds and alloys, singly or preferably in combination, into polymer latexes, desirably at room temperature, forming a fluid mixture. Despite solids loadings in excess of 89 weight percent of the total loaded polymer, the latex based formulations are sufficiently low in viscosity to be able to be poured. This low viscosity allows the use of processing procedures, such as liquid casting, not previously available in the production of attenuation products. Additives known in the art to alter viscosity, aid in dispersion, and remove entrapped air can be added to the latex. Such additives are especially useful when dealing with latex having a higher pH, e.g., above about 8.5, and preferably above about 8.

In one embodiment, high metal loadings may be achieved while maintaining the desired final polymer properties, by using metal fillers having an average particle size of greater than 5 microns, preferably at least about 8 microns, and most preferably at least about 10 microns. If a metal compound is used, it should be substantially insoluble in water. Suitable methods of determining average particle size are known, and include, but are not limited to, analyzing with a scanning electron microscope.

In one embodiment, the resulting fluid mixture can be readily cast onto a non-adherent surface such as release paper at a thickness of as low as about 0.010 inches, or preferably at least about 0.015 in., dried into a flexible sheet, and removed from the paper. These resulting flexible sheets can be used in the manufacture of any product in which radiation attenuation properties are advantageous, e.g., aprons, thyroid shields, gonad shields, and gloves. However, the invention is not limited to these purposes and has numerous applications across a large spectrum of industries.

In a further embodiment, casting the metal-filled blend as a sheet, onto an adherent substrate, which becomes part of the final product, results in a product with much higher tensile and strength properties. Such substrates, which can become part of the final structure, include, but are not limited to: polymer sheets such as those made from vinyl or polyolefin; woven fabrics such as those made from cotton, linen, polymeric fibers, carbon fibers or the like, as well as blends of different types of natural and synthetic fibers; and non-woven fabric made of natural, polymeric, or carbon-fiber materials.

Products made based on the invention have been found to be as much as 40% lighter than corresponding products made from standard lead filled vinyl.

DETAILED DESCRIPTION

Specific embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

The present invention relates to radiation attenuation compositions that are low-weight, ultra-thin and flexible sheets and which are formed by heavy loading of high atomic weight metals into polymer latexes. For example, the loading of the high atomic weight metals exceeds about 89 percent by weight and, more particularly exceeds about 90 percent by weight of the combined final sheet product, and more preferably is at least about 92% by weight of the total sheet product.

For the present invention, metals found to be effective include metallic elements having an atomic number greater than 45, and preferably greater than about 50, such as antimony, tin, barium, bismuth, cesium, cadmium, indium, rhodium, tungsten and uranium, and lead, (and their compounds and/or alloys), such as tin/lead, barium sulphate, gadolinium oxide, and other heavy metals that have non-radioactive isotopes, Other high atomic number elements or their compounds also include, but are not limited to: cerium and gadolinium. In yet another embodiment, suitable metals include tantalum, silver, gold and other precious metals. In a specific embodiment, the metal particles have a platelike appearance where one of the dimensions is an order of magnitude less than the other two dimensions, and the other two dimensions differ by no more than a factor of four, and more particularly by not more than a factor of three.

Suitable thicknesses of the final sheet product include, but are not limited to, in the range of at least about 0.010 in., and more specifically in the range of at least about 0.015 in. and more specifically in the range of from about 0.030 to about 0.070 in. In yet another embodiment, the thickness can vary depending on the desired attenuation.

Unless otherwise indicated, the term "latex" includes dispersions of a polymer into an aqueous liquid. Such liquid dispersions are well-known in the art and are commercially available. They can include both natural and synthetic polymers dispersed into the aqueous liquid. Suitable polymer latexes include, but are not limited to: acrylic, styrene/butadiene, vinyl acetate/acrylic acid copolymers, vinyl acetate, ethylene vinyl acetate, polybutene, and urethane, latexes are prepared by the polymerization of a monomer in an aqueous medium. Typically, the acrylic, styrene/butadiene, and acetate polymer latexes are made in this manner.

In another embodiment, a coating of unfilled latex is applied to the surface of the dried filled polymer composition. In another specific example, Rohm & Haas acrylic, trade name "TR 38HS" was used as the coating. In another example, a natural rubber latex, from Firestone, trade name "HARTEX 101", was used as the coating. The coating thickness can vary. Examples of the thickness of the coating is in the range of about 0.25 mils to about 4 mils. The additional coating layer can improve the strength, stretchiness andor tear resistance of the overall end product.

In one embodiment, high metal loadings may be achieved while maintaining the desired final polymer properties, by using metal fillers having an average particle size of greater than 5 microns, preferably at least about 8 microns, and most preferably at least about 10 microns. If a metal compound is used, it should be substantially insoluble in water. Suitable methods of determining average particle size are known, and include, but are not limited to, analyzing with a scanning electron microscope.

In a further embodiment, when tin is employed as the metal in the mixture, latexes of varying pH ranges (e.g. less than about 10) can be employed. In yet another embodiment, especially when dealing with latexes having a pH of above about 8 the order of addition of the components (e.g. latex and metal) can assist in the dispersion of the components. For example, adding tungsten after the latex mixture is prepared, including the addition of all dispersion additives, produced will assist in the overall dispersion of the tungsten, and the tin is added after the tungsten is dispersed, an improved attenuation will be achieved.

In yet a further embodiment, when a combination of metal fillers of differing particle sizes, is added to the latex, e.g., tin and tungsten, latexes of varying pH ranges (e.g. pH of not more than about 10) can be employed. In yet another embodiment, the order of addition of the several metal filler components can improve the dispersion of the metal filler components, preferably adding the finer particle filler first. As a further improvement the average combined particle size should preferably be at least about 8.

For example, for the tin/tungsten composition, where the tungsten is available in a very small particle size, e.g., 1 micron or smaller, first dispersing the tungsten alone, after the polymer latex is fully mixed with the additives to be used, and thereafter adding the tin particles to the mixture, will allow the formation of the combined tin-tungsten overall dispersion of the composition of this invention while maintaining the suitable characteristics of the latex dispersion and the final dried polymer product, even at higher pH values. Specifically, a suitable casting dispersion comprising natural rubber latex can be formed with the tin/tungsten filler, by a method following this order of addition.

Specifically, a vacuum dispersion mixer, manufactured by Shar Systems, Inc., of Fort Wayne, Ind., can be used to prepare the casting mixture. First, all the liquids are added to the mixer tank, including the latex dispersions and any desired additives; a vacuum of at least 26 inches is drawn, and the liquids are mixed for one minute, at a blade speed of 400 rpm. The vacuum is broken and the tungsten particles (having a particle size of less than one micron) are added, followed by vacuuming and one minute mixing. The mixer is again opened and the metal particles (particle size of about 20 microns) are added to the mixture, followed by a three-minute mix cycle at 1000 rpm and a second metal particle addition, where suitable would follow, with further mixing under vacuum. The mix cycles and blade rotation speed can be varied depending on the latex, metals, solids loading, and shear sensitivity of the latex. All mixing is carried out at ambient temperature, little heat is generated.

In yet another embodiment, additives can be employed so as to aid in the preparation of the mixes and to adjust the end physical properties and structure of the end product. Of particular interest are those materials that aid in the uniform dispersion of the metals, to prevent the incorpation of air, and to defoam if necessary. Suitable additives include, but are not limited to, surfactants, defoamers, antifoaming agents, dispersing aids, stabilizers (e.g., Rohm & Haas trade name "Accumer, an alkoxylated alkylphenol and Rohm & Haas Tamol, a sulfonated naphthalene) plasticisizers (e.g. Rohm & Haas's plastisizer "Paraplex WP-1, a proprietary polymeric plastisizer", aqueous ammonia). Other additives that can be used in the manufacture of different formulations include: Foamaster VF®, a proprietary defoamer from Cognis Corporation; Daxad 30™, a sodium polymethacrylate from Hampshire Chemical; Aersol® LF-4, a proprietary surfactant from Cytec Industries; Surfynol DF-210, a defoamer from Air Products; Troykyd™ D729, a silicone-based antifoam agent from Troy Chemical; Aersol® OT-75%, a sodium dioctyl sulfosuccinate from Cytec Industries; and Solsperse 27000, an aromatic polymeric alkoxylate from Avecia Limited.

In another embodiment, a blend of latexes can be employed. Suitable blends of latexes include, but are not limited to, ethylene vinyl acetate and acrylic polymers, acrylic and styrene acrylic polymers, polybutene and natural rubber polymers, polybutene and acrylic polymers, styrene-butadiene polymers, and styrene acrylic polymers, isoprene and acrylic polymers, and similar blends. Each of these blends have to be modified with appropriate additives for best performance. In a specific example, natural rubber latex and other latexes can be employed so that the latex mixture can be vulcanized, if desired. In a further embodiment, in addition to using elements and compounds, alloys of the heavy metals can also be employed. Suitable alloys of attenuation metals include, but are not limited to, tin/lead, antimony/lead, tin/antimony, tin/silver, and bismuth/tin, lead/bismuth, tin/bismuth and bismuth/lead/tin/cadium/indium.

In one example of a standardized test for determining the radiation attenuation equivalent to 0.5 mm thickness of a pure lead sheet, i.e., the lead equivalence, an X-ray attenuation sheet material is made from a loaded polymer, by casting into a sheet having a desired thickness, e.g., 0.0167 inches. The sheet is then cut into test squares measuring 4.5 inches. The cut squares are tested in accordance with the following protocol. The test sample is placed between the output beam from a standard medical x-ray generator and a detector, exposing the sample to x-ray radiation of known properties. Specifically, the sample is placed on a lead test shelf that is 23 inches below the x-ray tube and 13 inches above the detector. The shelf has a 2.0 inch diameter opening. For non-lead attenuating materials, the beam energy is set to 100 Kvp, at 100 milliamperes, and exposure times set to 1 second for a one-layer test.

The sample is exposed to the x-rays and the non-absorbed energy, i.e., the x-ray energy passing through the sample, is measured. An x-ray exposure meter is used to measure the non-absorbed beam energy. The performances of pure lead control samples of known attenuation effectiveness are measured by this same procedure. The lead controls were selected to have attenuation just above, just below, and approximately the same as the attenuation of the test piece. The performance of the sample is compared to the known lead controls and the exact attenuation of the sample is calculated via interpolation.

It should be noted that where the following examples used tin or tungsten particles, the tin product used was Grade 140 manufactured by Accupowder International, LLC (having an average particle size of about 20 microns), and the Tungsten powder used was Tungsten Powder Grade, manufactured by Buffalo Tungsten, Inc. (having an average particle size of less than 1 micron).

EXAMPLE 1

A mixture of the following formulation was prepared:

| | |
|---|---|
| Rohm & Haas TR38 HS (pH 7–8) | 25 grams |
| Tin powder | 150 grams. |
| Tungsten powder | 60 grams. |

To form the final product the polymer latex and metals were weighed in separate cups. The metals were poured into the latex and mixed using a small spatula. The fluid mixture was stirred until a smooth, pourable mixture was obtained. The mixture was poured onto release paper and knifed over shims of known thickness. The sheet was then dried for ten minutes in a convection oven at 160° F.

The product of Example 1 weighed 57.1 grams, equivalent to 0.89 pounds per square foot at an equivalence of 0.50 mm of lead. The metals loading was 93.8% by weight or 65% by volume. The product was soft and supple and could be used for manufacturing a garment having highly effective attenuation properties.

EXAMPLE 2

Using the above procedures, the following formulation was prepared.

| | |
|---|---|
| Air Products Air Flex 400 ethylene vinyl acetate copolymer latex (having a pH of 4.5, a Solids Content of 52%) - | 25 grams |
| Tin Powder | 150 grams |
| Tungsten Powder | 60 grams |
| Water | 7 grams |

The product of Example 2 at an equivalence of 0.50 mm of lead would weigh 54.2 grams, equivalent to 0.85 pounds per square foot. The metals loading was 93.8% by weight or 65% by volume. The product was soft and supple and both top and bottom surfaces had an excellent, smooth appearance. This product could be used for manufacturing an attenuation garment.

EXAMPLE 3

Using the above procedures, the following formulation was prepared.

| | |
|---|---|
| Air Products Air Flex 400 ethylene vinyl acetate copolymer latex | 25 grams |
| Tin powder | 120 grams. |
| Tungsten powder | 40 grams. |
| Bismuth powder | 40 gams |
| Water | 3.8 grams |

The product of Example 3 would weigh 55 grams, equivalent to 0.86 pounds per square foot at a pure lead equivalence of 0.50 mm. The metals loading is 94.1% by weight or 65.5% by volume. The sheet product was soft and supple. Both top and bottom surfaces had an excellent, smooth appearance. The resulting product could be used for manufacturing an attenuation garment.

EXAMPLE 4

Blending different latexes improved the overall appearance and strength of the final product.

One such blend formulation was:

| | |
|---|---|
| Rohm & Haas TR38 HS Acrylic polymer latex (pH 7–8; Solids Content 50%–52%) | 0.175 pounds |
| Air Products Air Flex 920 Acrylic polymer latex (pH 4 - Solids Content 55%) | 0.0925 pounds |
| Tin Powder | 3.3 pounds |
| Tungsten Powder | 1.1 pounds |

This blend was mixed in a five quart Hobart mixer. The mixture was cast on release paper using a production knife over roll coating system. The material was dried at 160° F.

The product of Example 4 was found to have a weight of 50.4 grams at an equivalence of 0.50 mm of lead. This weight corresponds to a weight of 0.79 pounds per square foot. The metals loading was 94.3% by weight and 67.7% by volume. The product was soft and supple and both top and bottom surfaces had an excellent, smooth appearance. This product had sufficient strength that it could be used for an attenuation garment.

EXAMPLE 5

Preferably, excellent results have been obtained by coating the fluid mixture onto a substrate to improve tear strength.

A vinyl film (PVC) approximately 0.007 inch thick was cast onto release paper. The latex blend was prepared as outlined above, and coated onto the vinyl film (still on the release paper). The casting was then dried in a convection oven.

The latex formula prepared was:

| | |
|---|---|
| Rohm & Haas 1845 Styrene Acrylic copolymer latex (pH 6.7, Solids Content 56%) | 32 grams |
| Tin Powder | 150 grams |
| Tungsten Powder | 60 grams |

The product of Example 5 was found to have a weight of 56.3 grams at an attenuation equivalence of 0.50 mm of lead. This weight corresponds to 0.88 pounds per square foot. The metals loading was 92% by weight and 59% by volume. Equally useful products can be obtained using as a substitute nylon, muslin, rag cloth and non-woven fabrics of several types.

EXAMPLE 6

In this example, the addition of glycerin and water (50 parts of each) to the fluid latex mixture resulted in the final product having increased flexibility. The following formulation was prepared and knife coated onto a polyolefin non-woven substrate supplied by Crane Paper, product number BC-9.

The formulation was:

| | |
|---|---|
| Rohm & Haas 1845 Styrene Acrylic copolymer latex (pH 6.7 - Solids Content 56%) | 18 grams |
| Air Products Air Flex 920 Acrylic polymer latex pH 4 - Solids Content 55% | 7 grams |
| Tin | 160 grams |
| Tungsten | 40 grams |
| Glycerine USP | 0.75 grams |

The product of Example 6 was found to have a weight of 55 grams at an attenuation equivalence of 0.50 mm of lead including the weight of the substrate. For comparison purposes and excluding the substrate, this weight corresponds to a weight of 0.86 pounds per square foot. The metals loading was 93.9% by weight and 67% by volume.

EXAMPLE 7

The following formulation was prepared and knife coated onto a polyester non-woven, calendered substrate supplied by Crane Paper, product number RS-21.

The formulation:

| | |
|---|---|
| Rohm & Haas 1845 Styrene Acrylic copolymer latex pH 6.7 - Solids Content 56% | 18 grams |
| Air Products Air Flex 920 Acrylic polymer latex pH 4 - Solids Content 55% | 7 grams |
| Tin powder | 160 grams |
| Tungsten powder | 40 grams |
| Glycerine USP | 0.75 grams |

The product of Example 7 was found to have a weight of 54 grams at an attenuation equivalence of 0.50 mm of lead, including the weight of the substrate. For comparison purposes and excluding the substrate, this weight corresponds to a weight of 0.84 pounds per square foot. The metals loading was 93.9% by weight and 67% by volume.

EXAMPLE 8

In another example, additives can be employed so as to adjust the end physical properties and structure of the end product. In this example, Rohm & Haas dispersing aid, trade name "Accumer, an alkoxylated alkylphenol" was added to the mix as was Rohm & Haas's plastisizer "Paraplex WP-1, " to make the end products more flexible. X-ray attenuation products are compared to the lead equivalence.

A formulation using these additives was:

| | |
|---|---|
| Rohm & Haas 1845 | 20 grams |
| Air Products Air Flex 920 | 4 grams |
| Tin | 150 grams |
| Tungsten | 55 grams |
| Accumer | 0.3 grams |
| WPI | 0.3 grams |

Samples of this formulation averaged a 0.5 mm lead equivalence weight of 57 grams, or about 0.88 pounds per square foot.

EXAMPLE 9

In a further example, excellent products can be made using a blend of natural rubber latex and other latexes. An advantage of the natural latex is that the product can be vulcanized to improve the physical properties. One such formulation uses Firestone's "Hartex 101" having a pH of 9.78 and a solids content of 62%, and includes a Vanderbilt dispersion aid, "Darvan 7" (a sodium polymethacrylate), a sulfur composition from Akreochem grade W-9944 and a zinc oxide accelerator from Akrochem, grade w-9989, is as follows:

| | |
|---|---|
| Rohm & Haas 1845 | 0.6 pounds |
| Hartex 101 | 0.4 pounds |
| Tin | 9.2 pounds |
| Darvan 7 | 35 grams |
| Sulfur (additive) | 1.6 grams |
| Accelerator (zinc oxide) | 2.2 grams |

A test piece having a 0.5 mm lead equivalence weighs about 59 grams and has desirable physical properties, namely tensile strength and elasticity.

EXAMPLE 10

In another example, in addition to using elements and compounds, alloys of attenuation materials can also be employed. A tin/lead alloy with 40 weight % tin and 60 weight % lead from Cookson Industries, grade 113918, was used in the following formulation:

| | |
|---|---|
| Rohn & Haas 1845 | 0.6 pounds |
| Hartex 101 | 0.4 pounds |
| Alloy | 9.13 pounds |
| Darvan 7 | 35 grams |

The weight of the standard test piece to achieve a 0.5 mm lead equivalence was 71 grams.

Whereas particular embodiments of the present invention have been described above as examples, it will be appreciated that variations of the details may be made without departing from the scope of the invention. One skilled in the art will appreciate that the present invention can be practiced by other than the disclosed embodiments, all of which are presented in this description for purposes of illustration and not of limitation. It is noted that equivalents of the particular embodiments discussed in this description may practice the invention as well. Therefore, reference should be made to the appended claims rather than the foregoing discussion of examples when assessing the scope of the invention in which exclusive rights are claimed.

EXAMPLE 11

For mixing the filled latex dispersions of the present invention it is preferred to use a a low shear, high pumping action dispersion blade, well known to the art. In this example, a Shar vacuum dispersion mixer with a three gallon capacity mixing bowl is used.

A latex premix is prepared according to the following formula:

| | |
|---|---|
| Rohm & Haas TR-38HS | 10 pounds |
| Hartex 101 | 10 pounds |
| Darvan 7 | 1.6 pounds |
| Ammonia 3% | 0.7 pounds |
| Glycerin | 80 grams |

The ammonia solution is an additive serving to stabilize the final mix.

The Hartex 101 latex is initially mixed with the Darvan 7, ammonia and glycerin. This combination was hand stirred using a spatula. The Rohm & Haas latex is then added to form the latex premix.

The casting formulation includes:

| | |
|---|---|
| Latex premix | 8.8 pounds |
| Tin | 56 pounds |
| Tungsten | 16 pounds |

The premix is added to the mixing bowl of the Shar mixer followed by the Tungsten powder. A vacuum of at least 26 in. Hg, is pulled on the mixing bowl and the tungsten is mixed into the latex premix for one minute. The vacuum is then broken and the tin added. After drawing a vacuum, the material is mixed to disperse the metals for a further three minutes.

The mixture is cast on release paper and oven dried. The standard test piece of the final product has a weight of 58 grams, or 0.88 pounds per square foot, with a single layer thickness of 0.022 inches. After applying a latex coating of approximately 0.5 mils, to the dried sheet, the resulting product is strong with good tensile strength and elasticity.

What is claimed is:

1. A loaded polymer sheet loaded with a high atomic weight metal useflul for forming a protective garment, wherein the quantity of the loaded high atomic weight metal exceeds about 89 percent by weight of the total loaded polymer sheet, including the polymer and the metal, and wherein the thickness of loaded sheets required to achieve the radiation attenuation equivalence to 0.5 mm of a pure lead sheet has a weight of less than about 1.0 pound/square foot.

2. The loaded polymer sheet of claim 1 wherein the high atomic weight metal has an atomic number greater than 45.

3. The loaded polymer sheet of claim 2 wherein the metal is selected from the group consisting of antimony, tin, bismuth, tungsten, lead, cadmium, indium, cesium, cerium and gadolinium and any combination thereof.

4. The loaded polymer sheet of claim 2 wherein the metal is selected from the group consisting of antimony, tin, bismuth, tungsten, and lead, and any combination thereof.

5. The loaded polymer sheet of claim 2 having a thickness of at least about 0.010 inches.

6. The loaded polymer sheet of claim 2 having a thickness of in the range of from about 0.015 inches to about 0.05 inches.

7. The loaded polymer sheet of claim 2 wherein the polymer is selected from the group consisting of natural and synthetic polymers.

8. The loaded polymer sheet of claim 7 wherein the polymer is selected from the group consisting of acrylic, styrene/butadiene, vinyl acetate/acrylic acid copolymers, vinyl acetate, ethylene vinyl acetate, polybutene, and urethane polymers, and natural rubber and combinations thereof.

9. The loaded polymer sheet of claim 2 wherein the polymer sheet is formed from a fluid polymer latex having a pH value of not greater than about 10 and with at least one high atomic weight metal in particulate form dispersed therein in an amount of at least 89% by wt. of the combined polymer and metal particles, the latex being sufficiently fluid to be able to be poured to cast a sheet on a flat substrate.

10. The loaded polymer sheet of claim 9 wherein the latex has a pH of not greater than about 10 and the metal comprises metal particles having an average particle size of at least about 8 microns.

11. The loaded polymer sheet of claim 10 wherein the polymer is an elastomer and the metal particles have an average particle size of at least about 10 microns.

12. A garment selected from the group consisting of aprons, thyroid shields, gonad shields and gloves for the purpose of protecting the wearer from radio frequency radiation, wherein the garment is made from the loaded polymer sheet of claim 2.

13. A garment for use for protection from radio frequency radiation, comprising the loaded polymer sheet of claim 2.

14. The method of producing a loaded polymer sheet comprising the steps of:
- mixing a high atomic weight metal in particulate form into a polymer latex, wherein the high atomic weight metal exceeds about 89 percent by weight of the total polymer plus metal in the latex, casting the latex on a flat surface, and
- drying the cast latex to form a useful loaded polymer sheet that weighs less than about 1.0 pound/square foot at a thickness required to achieve the equivalent radiation attenuation as a pure lead sheet having a thickness of 0.5 mm.

15. The method of claim 14 wherein the high atomic weight metal has an atomic number greater than 45.

16. The method of claim 15 wherein the metal is selected from the group consisting of cadmium, indium, cesium, cerium and gadolinium and any combination thereof.

17. The method of claim 14 wherein the metal is selected from the group consisting of antimony, tin, bismuth, tungsten, lead, and any combination thereof.

18. The method of claim 14 wherein the thickness of the sheet is at least about 0.010 inch.

19. The method of claim 14 wherein the thickness of the sheet is in the range of from about 0.015 inch to about 0.07 inch.

20. The method of claim 19 wherein the polymer latex is selected from the group consisting of acrylic polymers, styrene/butadiene copolymers, vinyl acetate/acrylic acid copolymers, vinyl acetate polymers, ethylene vinyl acetate polymers, polybutene polymers, urethane polymers and combinations thereof.

21. The method of claim 14 wherein the polymer latex is selected from the group consisting of natural and synthetic polymers.

22. The method of claim 14 wherein an additive is incorporated into the latex.

23. The method of claim 22 wherein the additive is selected from the group consisting of surfactants, defoamers, antifoaming agents, dispersing aids and plasticizer.

24. The method of claim 14 wherein the polymer latex is selected from the group o mixed polymers consisting of ethylene vinyl acetate and acrylic poplymers, acrylic and styrene acrylic polymers, polybutene and natural rubber polymers, polybutene and acrylic polymers, styrene-butadiene and styrene acrylic polymers, and isoprene and acrylic polymers.

25. The method of claim 14 comprising the additional step of:
- after the mixture is dried, applying a coating of unfilled latex to a surface of the dried loaded polymer sheet.

26. The method of claim 25 wherein a thickness of the coating is in the range of about 0.25 mils to about 4 mils.

27. The method of producing a loaded polymer sheet comprising the steps of:
- mixing particulate tungsten metal into a polymer latex;
- adding tin metal to the mixture, such that the total amount of the combination of tin and tungsten metals exceeds about 89 percent by weight of the total weight of polymer and metal; and
- drying the mixture to form a loaded polymer sheet that weighs less than about 1.0 pound/square foot at a thickness of loaded polymer sheet required to achieve the equivalent attenuation as 0.5 mm thickness of a pure lead sheet.

28. The method of claim 27 wherein the polymer latex comprises a natural rubber latex.

29. A polymer latex, comprising dispersed polymer and a high atomic weight metal in particulate form, wherein the high atomic weight metal exceeds about 89 percent by weight of the total polymer plus metal in the latex, having a viscosity sufficiently low to permit casting the latex on a flat surface.

* * * * *